(12) United States Patent
Full

(10) Patent No.: US 10,158,322 B2
(45) Date of Patent: Dec. 18, 2018

(54) SYSTEMS AND METHODS FOR WEIGHT-BASED REPOSITIONING OF SOLAR ENERGY COLLECTION DEVICES

(71) Applicant: SUNSALUTER, San Francisco, CA (US)

(72) Inventor: Eden Full, Calgary (CA)

(73) Assignee: SUNSALUTER, New York, NY (US)

( * ) Notice: Subject to any disclaimer, the term of this patent is extended or adjusted under 35 U.S.C. 154(b) by 304 days.

(21) Appl. No.: 15/017,414

(22) Filed: Feb. 5, 2016

(65) Prior Publication Data

US 2016/0156305 A1 Jun. 2, 2016

Related U.S. Application Data

(63) Continuation-in-part of application No. 14/027,108, filed on Sep. 13, 2013, now Pat. No. 9,276,520.

(Continued)

(51) Int. Cl.
| | |
|---|---|
| *H02S 20/32* | (2014.01) |
| *F24S 50/20* | (2018.01) |
| *F24S 25/70* | (2018.01) |
| *F24J 2/38* | (2014.01) |
| *F24J 2/52* | (2006.01) |
| *F24J 2/54* | (2006.01) |
| *F24S 25/632* | (2018.01) |

(Continued)

(52) U.S. Cl.
CPC .................. *H02S 20/32* (2014.12); *F24J 2/38* (2013.01); *F24J 2/523* (2013.01); *F24J 2/5233* (2013.01); *F24J 2/5254* (2013.01); *F24J 2/541* (2013.01); *F24S 25/70* (2018.05); *F24S 50/20* (2018.05); *F24J 2002/5486* (2013.01); *F24J 2002/5493* (2013.01); *F24S 25/13* (2018.05); *F24S 25/632* (2018.05); *F24S 30/425* (2018.05); *Y02E 10/47* (2013.01)

(58) Field of Classification Search
CPC ..... H02S 20/32; F24J 2/38; F24J 2/523; F24J 2/5233; F24J 2/541; F24J 2/5254; F24J 2002/5486; F24J 2002/5493; F24S 50/20; F24S 25/70
See application file for complete search history.

(56) References Cited

U.S. PATENT DOCUMENTS

| | | |
|---|---|---|
| 4,476,854 A | 10/1984 | Baer |
| 2008/0087318 A1 | 4/2008 | Jwo |

(Continued)

OTHER PUBLICATIONS

White, Brian, "New very simple dripper tracker! Use as part of your solar tracker ot get more power from your PV"; <https://www.youtube.com/watch?v=MY_y-uMYvao&list=PLA00D159D0DA7CC27&index=1> pub. Aug. 2012, accessed Oct. 2015.*

(Continued)

*Primary Examiner* — Allison Bourke
(74) *Attorney, Agent, or Firm* — Orrick, Herrington & Sutcliffe LLP

(57) ABSTRACT

Systems and methods for positioning solar energy collection devices are disclosed. In one embodiment, an integrated unit combines the necessity of solar panel repositioning with water filtration. While also providing clean water for the end user, the integrated unit uses controlled weight displacement to rotate a solar panel to follow the sun from east to west—a process also known as horizontal (azimuth) solar tracking.

14 Claims, 17 Drawing Sheets

Related U.S. Application Data

(60) Provisional application No. 61/700,839, filed on Sep. 13, 2012.

(51) Int. Cl.
*F24S 30/425* (2018.01)
*F24S 25/13* (2018.01)

(56) References Cited

U.S. PATENT DOCUMENTS

| | | | |
|---|---|---|---|
| 2009/0025708 A1* | 1/2009 | Shingleton | F24J 2/5431 |
| | | | 126/600 |
| 2012/0097149 A1 | 4/2012 | Doyle | |
| 2015/0007896 A1* | 1/2015 | Joret | F02C 7/045 |
| | | | 137/15.1 |

OTHER PUBLICATIONS

Full, Eden, Passionate Passivity, John G. Diefenbaker High School, 2 Pages, Science Fair Project Mar. 2008, http://www.odec.ca/projects/2008/full8e2/.
Full, Eden, SunSaluter, 20 page PowerPoint, Sep. 28, 2011.
R&D Magazine, Sunflowers inspire more efficient solar power system, Aug. 2012, 2 Pages, http://www.rdmag.com/News/2012/08/Energy-Sunflowers-Inspire-More-Efficient-Solar-Power-System/.
Zomeworks Corporation, Passive Energy Products, 4 Pages, http://www.zomeworks.com/photovoltaic-tracking-racks/, Sep. 18, 2012.
Social Good Summit : Startups for Good Challenge : Sun Saluter, http://www.youtube.com/watch?v=Djz0Or7APeM, Sep. 28, 2011.
YV presents: Eden Full http://www.youtube.com/watch?v=zzq6eX1-jrw.

\* cited by examiner

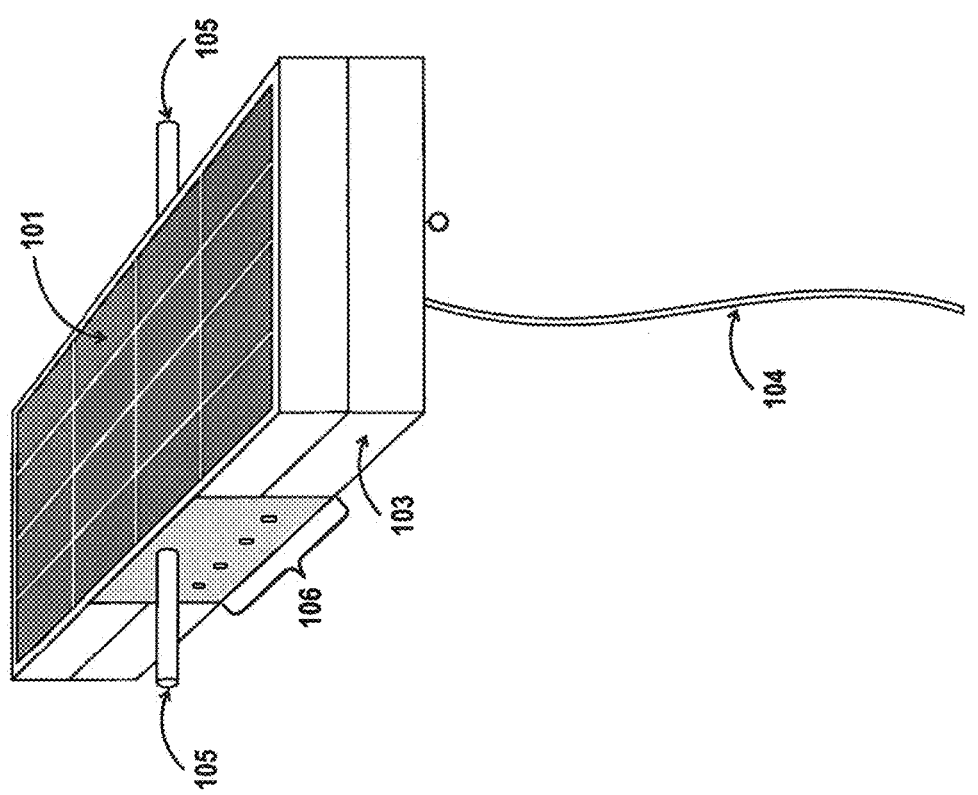

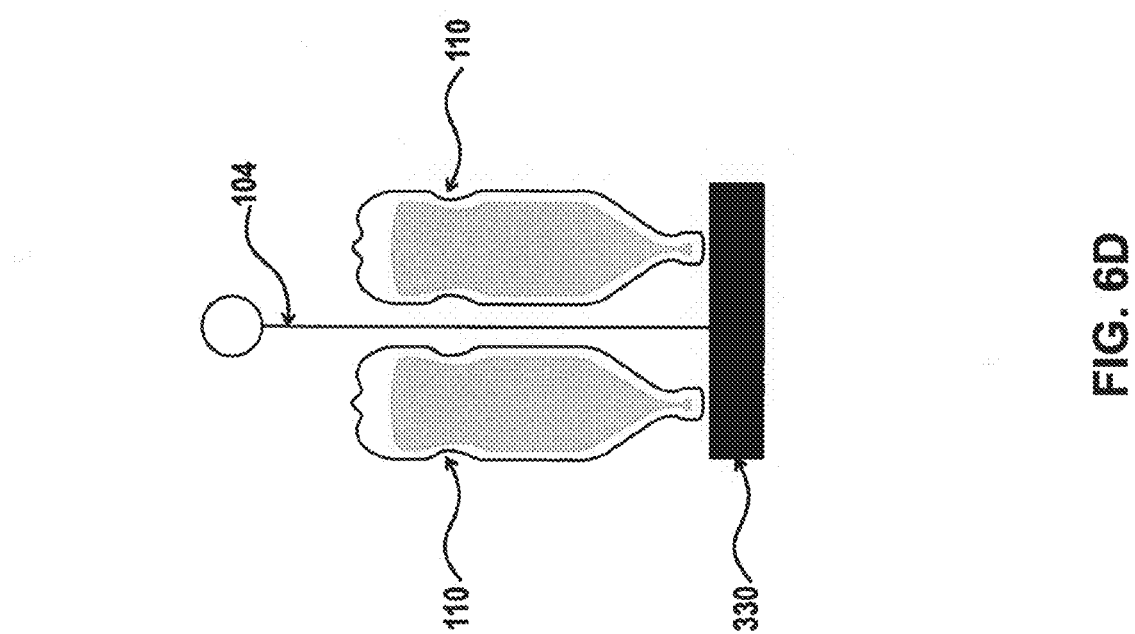

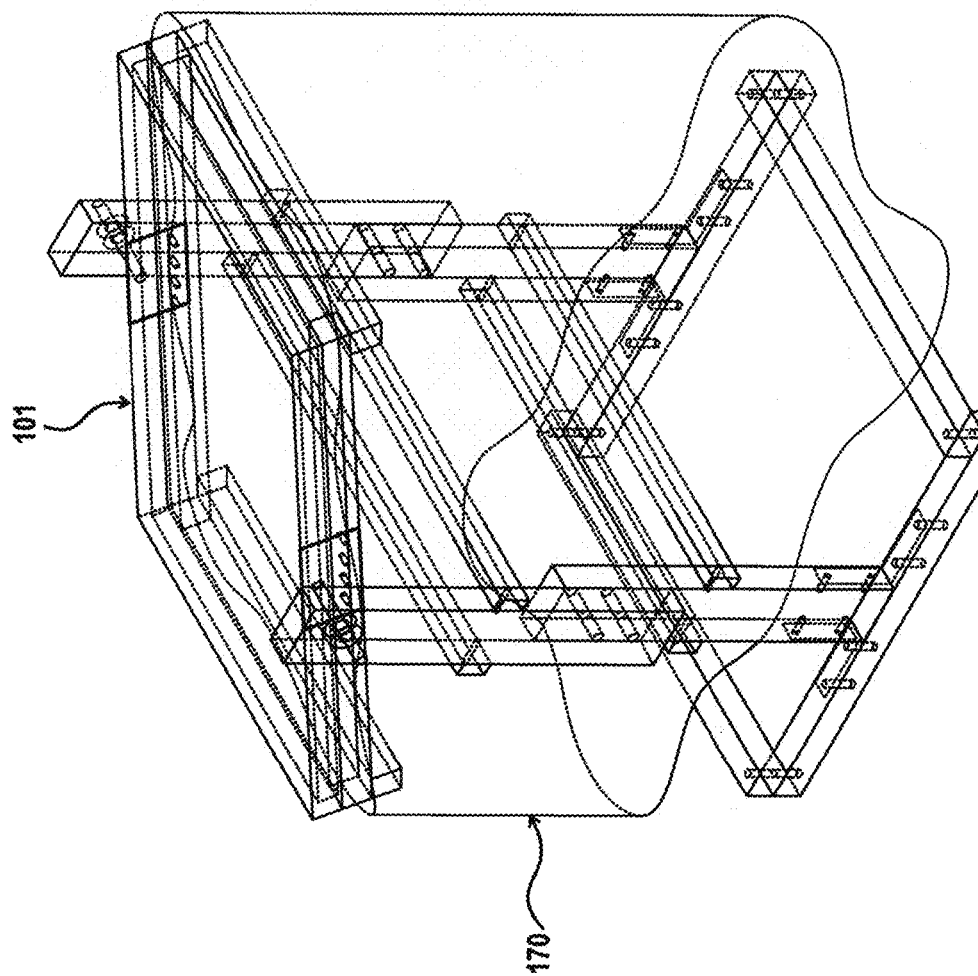

SYSTEMS AND METHODS FOR WEIGHT-BASED REPOSITIONING OF SOLAR ENERGY COLLECTION DEVICES

CROSS-REFERENCE TO RELATED APPLICATIONS

This application is a continuation-in-part of U.S. application Ser. No. 14/027,108 filed Sep. 13, 2013, which claims priority to U.S. provisional application Ser. No. 61/700,839, filed Sep. 13, 2012, which applications are fully incorporated herein by reference.

FIELD OF THE INVENTION

Embodiments are directed to systems and methods for solar energy collection devices, and more specifically, to systems and methods that reposition solar energy collection devices of all types (e.g., flat panel, as well as concentrated photovoltaics), based on, for example, solar tracking or calibration.

BACKGROUND

As the cost of solar energy continues to drop, the global supply of solar panels—both flat panel and concentrated photovoltaic, for example—continues to increase, benefiting on-grid and off-grid communities to promote the use of solar panels in developed and emerging energy markets. Consequently, an increasing need also grows to optimize these devices so that every individual panel can be generating as much output energy as possible, while minimizing both the up-front system cost as well as the maintenance cost over time for installed systems.

Conventional mechanisms reposition—or track—solar panels to follow the sun, facing the surface at a perpendicular angle to the sunlight to maximize energy collection. Solar panels turning from east to west on a daily basis—while being mounted at an appropriate seasonal angle depending on geographical latitude—are capable of generating up to 40% more electricity compared to a stationary panel on a fixed mount.

One of the most popular methods of repositioning uses active electronics through various means of satellite global positioning, maximum power point tracking algorithms and motors. Passive (e.g., non-electrical) repositioning devices use phase differentials of substances like Freon or wax that change form from liquid to gas as the ambient temperature increases and decreases with the rise and fall of the sun. Some systems also have been proposed to use bimetallic materials or manual adjustment input from the user to control the solar panel rotation. All of these methods not only have a high up-front cost, but also require frequent parts replacements in order to prevent system failure. Solar panel tracking systems provide the greatest economic value when the cost of one tracker is cheaper than the cost of another panel providing the equivalent increase in energy production.

Other designs to reposition solar panels using water displacement have been proposed in the past, but fail to incorporate water filtration into the design. Accordingly, a need exists for an improved system and method for repositioning solar energy collection devices in an effort to overcome the aforementioned obstacles and deficiencies of prior art systems.

SUMMARY

A general objective of some embodiments is to maximize the amount of electricity generated by an individual solar panel at all times during the day. Some embodiments are a cost-effective solar panel repositioning mechanism that can allow a panel to rotate. The solar panel is mounted on a central axle with support beams that provide the necessary degrees of freedom to follow the sun at an angle as close to perpendicular as possible, using weight displacement of a physical substance to control a gradual rotation movement throughout the day.

A second general objective of some embodiments is to consolidate the number of devices an end user would need to meet their basic needs (e.g., electricity and/or water) by creating an integrated technology unit. This integrated unit would both reduce the number of moving parts requiring attention on a daily basis and, ultimately, facilitate usability. This second general objective is twofold: 1) to optimize solar energy collection and 2) to exploit the weight transfer already occurring from another device. These embodiments streamline the user experience by minimizing the technical expertise required to assemble and to maintain the embodiment. Some embodiments have a minimal number of components in order to improve usability.

A third general objective of some embodiments is to control the solar panel's path of rotation throughout the day based on, for example, weight transfer of a physical substance via specific calibration of the substance's flow rate. In one embodiment, a first side of the solar panel is weighted to rotate. As weight accumulates on the first side of the panel throughout the day—altering the balance of the system—the panel will rotate to follow the azimuth path of the sun.

A fourth general objective of some embodiments is to rotate the solar panel passively (e.g., without the use of active electricity), thereby making the solar panel more intuitive for users. Some embodiments use the conversion of potential energy to mechanical energy, allowing all functioning parts of the system to be tangibly visible and comprehendible to any layperson. By minimizing the technical complexity of the system, end users of the device—regardless of their educational background—can repair, replace and maintain the system with minimal external interference. This is more user-appropriate than using active electrical methods that require specialized knowledge to operate.

A fifth general objective of some embodiments is to rotate the solar panel self-sufficiently when operated during an entire exposure period to the sun. At the beginning of each day, the system's calibrated weight displacement should be reset to transfer the physical substance onto the weighted side of the solar panel without additional manual input during daylight hours.

A sixth general objective of some embodiments is to protect the mounted rotating solar panel against opposing forces, such as wind loads, which may attempt to interfere with the operation of the system. In one embodiment, a dampener device or a skirt can be affixed to a bottom portion of the solar energy collection device (e.g., for preventing wind and other elements from adversely affecting the system).

A seventh general objective of some embodiments is to maximize the amount of electricity generated by an individual solar panel at all times during a season. Some embodiments have an adjustable mount acting as a secondary axle that allows for repositioning several times per year to account for the change in the altitude of the sun's path across the sky in different seasons. This is particularly useful to panel installations in non-equatorial regions of the world.

An eighth general objective of some embodiments is to allow for the consolidation of multiple smaller solar panels onto one tracker under the same mount, proportionally adjusting the calibrated weight transfer to accommodate the additional load. Adjustable brackets operated manually by threaded screws are used to hold solar panels of varying sizes in place. This helps in addressing the lack of standardization in the solar industry, especially as end users need to build greater electrical capacities for their systems.

BRIEF DESCRIPTION OF THE DRAWINGS

FIG. 4 illustrates a solar panel and supporting frame for use with a repositioning system in accordance with one embodiment of the present invention;

FIG. 6D illustrates an exemplary aluminum metal block for controlling flow rate of two originating containers of a repositioning system in accordance with one embodiment of the present invention;

FIG. 7 is a perspective view of a repositioning system having a protective skirt in accordance with a preferred embodiment of the present invention;

DETAILED DESCRIPTION OF PREFERRED EMBODIMENTS

Figure 1A:
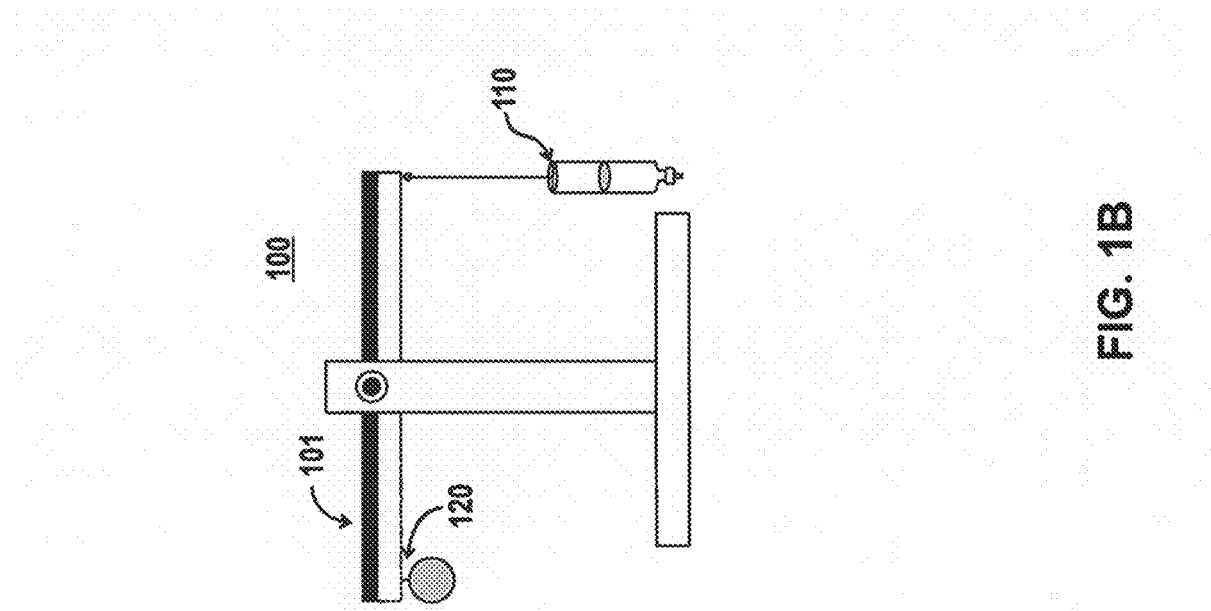
FIG. 1A illustrates an exemplary repositioning system at a first position in accordance with a preferred embodiment of the present invention.

The language used to disclose various embodiments describes, but should not limit, the scope of the claims. For example, in the following description, for purposes of clarity and conciseness of the description, not all of the numerous components shown in the schematic are described. The numerous components are shown in the drawings to provide a person of ordinary skill in the art a thorough enabling disclosure of the present invention. The operation of many of the components would be understood and apparent to one skilled in the art. Similarly, the reader is to understand that the specific ordering and combination of process actions described is merely illustrative, and the disclosure may be performed using different or additional process actions, or a different combination of process actions.

Each of the additional features and teachings disclosed herein can be utilized separately or in conjunction with other features and teachings to provide a solar energy collection system. Representative examples using many of these additional features and teachings, both separately and in combination, are described in further detail with reference to the attached drawings. This detailed description is merely intended for illustration purposes to teach a person of skill in the art further details for practicing preferred aspects of the present teachings and is not intended to limit the scope of the claims. Therefore, combinations of features disclosed in the detailed description may not be necessary to practice the teachings in the broadest sense, and are instead taught merely to describe particularly representative examples of the present disclosure. Additionally and obviously, features may be added or subtracted as desired without departing from the broader spirit and scope of the disclosure. Accordingly, the disclosure is not to be restricted except in light of the attached claims and their equivalents.

Rotating an individual solar panel to follow the azimuth path of the sun during the day can maximize the amount of electricity generated by the system by up to 40%, depending on environmental conditions. However, as previously discussed, existing solar repositioning systems often have a high up-front and maintenance cost and are also difficult for end users to assemble and repair self-sufficiently. Some embodiments aim to improve the task of solar panel repositioning. This will allow for greater accessibility to end users through minimizing cost, integrating the process into existing systems and ultimately simplifying the design.

Figure 1B:
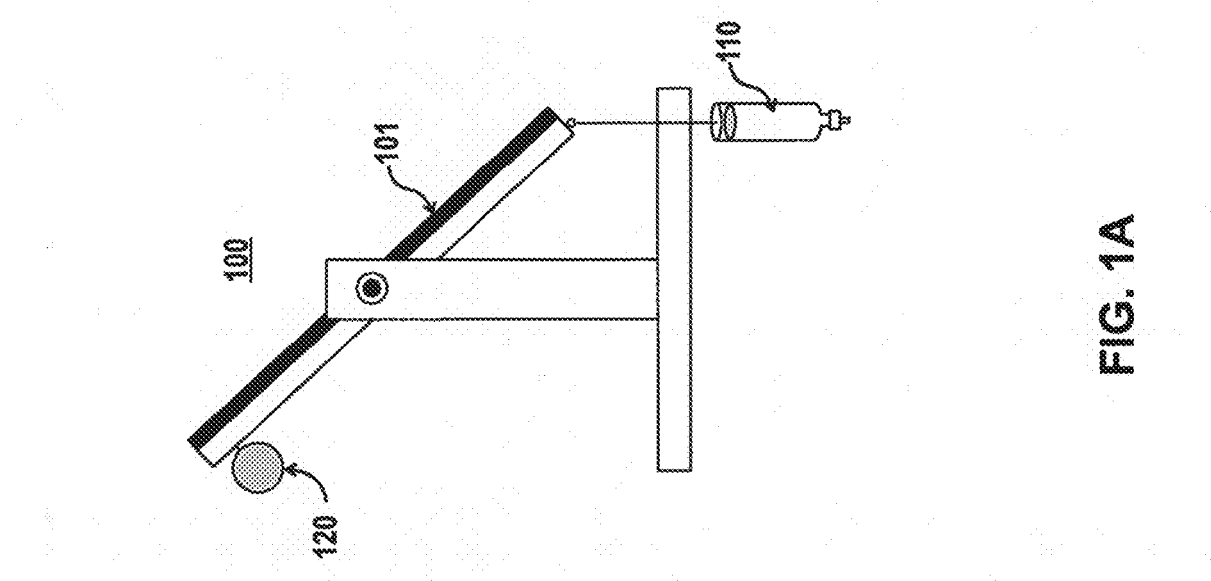
FIG. 1B illustrates the exemplary repositioning system of FIG. 1A at a second position in accordance with a preferred embodiment of the present invention.
Figure 1C:
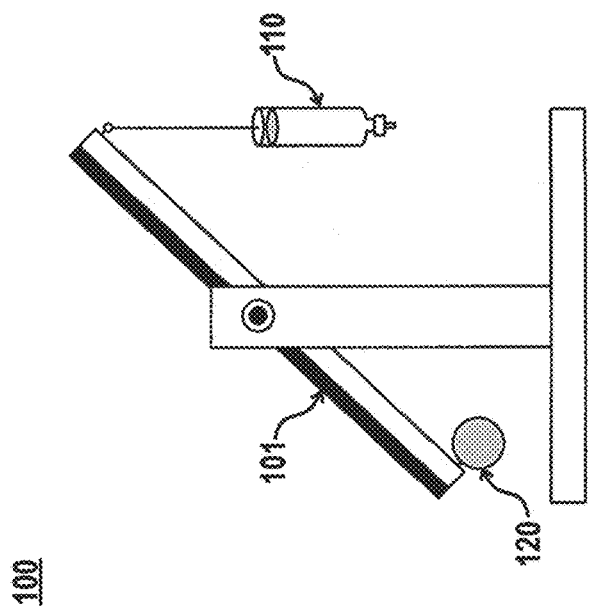
FIG. 1C illustrates the exemplary repositioning system of FIGS. 1A-B at a third position in accordance with a preferred embodiment of the present invention.

A preferred embodiment takes advantage of the mechanical process of weight transfer in order to accomplish the unmet task of rotation. This system repositions the solar panel passively using weight displacement, of water, for example—a process that already occurs in a water filtration unit—from an originating container into a collecting container. An exemplary repositioning system 100 for repositioning a solar energy collection device, such as from east to west throughout one ten-hour exposure period in a day, is illustrated in FIGS. 1A-C. In this example, the repositioning system 100 includes a solar panel 101 having a 150-degree range of motion. The first position, illustrated in FIG. 1A, allows the panel 101 to face a first direction (e.g., east) and rotate approximately 75-degrees within the first five hours. Accordingly, the solar panel 101 is positioned at an angle of 15-degrees from vertical. This position occurs because the volume of fluid (e.g., water) in an originating container 110, attached on the first direction (e.g., east) side of the solar panel, weighs more than the weight of a counterweight 120 on the opposing side. As the fluid flows from the originating container 110, the angle at which the panel 101 is facing the first direction (e.g., east) decreases from 75-degrees to zero, towards a parallel plane to the ground. The difference in the weight of fluid in the originating container and the counterweight continues to decrease as time elapses.

At a second position indicated in FIG. 1B, the panel 101 is positioned parallel to the ground, collecting incident radiation at an optimized angle (e.g., at noon) when the sun is directly overhead. At this point, the amount of fluid remaining in the originating container 110 matches the weight of the counterweight 120 that is attached on the opposing side of the panel 101.

At a third position indicated in FIG. 1C, the counterweight 120 is more than the weight of the fluid in the originating container 110, so the panel 101 continues to tilt toward a second direction (e.g., west). In this last five-hour period, there similarly will be a total rotation path of 75-degrees. The final third position of the solar panel 101 is an angle of 15-degrees from vertical, facing the second direction (e.g., west).

In this preferred embodiment, to ensure accurate tracking, the solar panel 101 is mounted to allow the pivot point to be above the solar panel 101, rather than below or level with the panel 101. The orientation of this mount provides a linear and gradual rotation of the solar panel 101 throughout the entire day, instead of a bimodal rotation that occurs when the pivot point is below the solar panel 101. If installed with a pivot point in a different location, the bimodal rotation behavior may occur when the counterweight 120 becomes heavier than the originating container 110.

Figure 2:
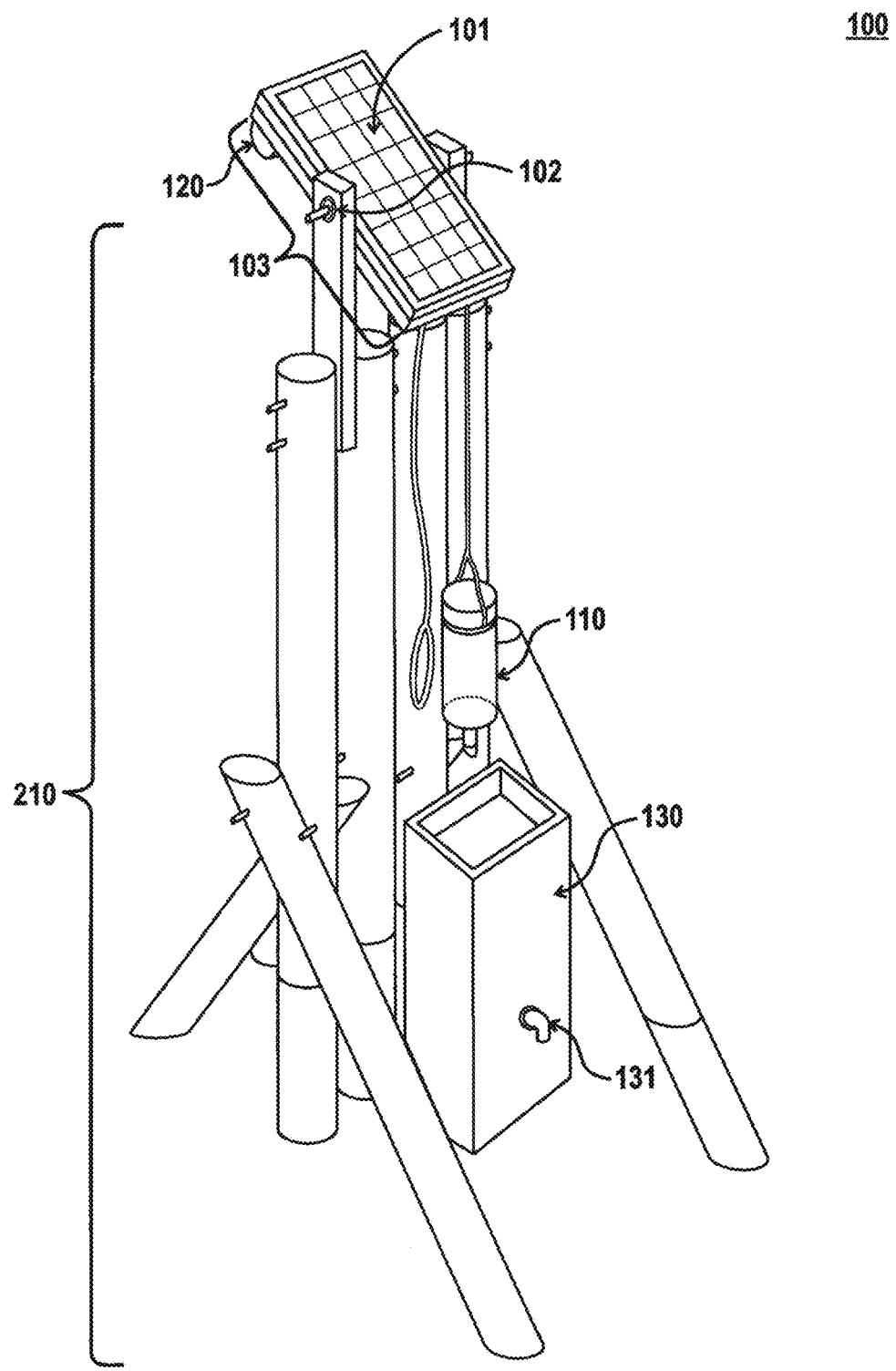
FIG. 2 illustrates a perspective view of the repositioning system of FIGS. 1A-C in accordance with a preferred embodiment of the present invention.

Turning now to FIG. 2, a collecting container 130 rests on the ground. The collecting container 130 includes a filtration unit (not shown) to filter the fluid (e.g., water) as it passes from the originating container 110 to the collecting container 130 throughout the day. If preferred, this allows the end user to use the collected fluid (e.g., water) throughout the day as it is filtered. The preferred embodiment ground-mounts the repositioning system 100 to provide stability while accommodating the presence of the originating and collecting containers 110 and 130, respectively. This ground-mounted design provides the additional advantage of allowing a user to have easy access to filtered fluid, should they need to collect the fluid in the middle of the tracking process, or make necessary adjustments. Additionally, ground-mounting system 100 protects against opposing forces (e.g., wind) because the weight displacement maintains the balance of the system 100.

As further illustrated in FIG. 2, the solar panel 101 is mounted upon a central axle 102 with at least one supporting rod 105 to provide the necessary degrees of freedom—for example, 150-degrees of rotation—to follow the sun at an angle as close to perpendicular as possible. The support rod 105 of the panel is fixed by a supporting frame 103, which can be adjusted to fit the dimensions of the solar energy collection device (e.g., solar panel 101), to a base supporting structure 210. In one embodiment, base supporting structure 210 is constructed using straight rods of wood, bamboo, metal or another type of material. The base supporting structure 210 can be any shape, such as the square-pyramidal form illustrated in FIG. 2.

Figure 3A:
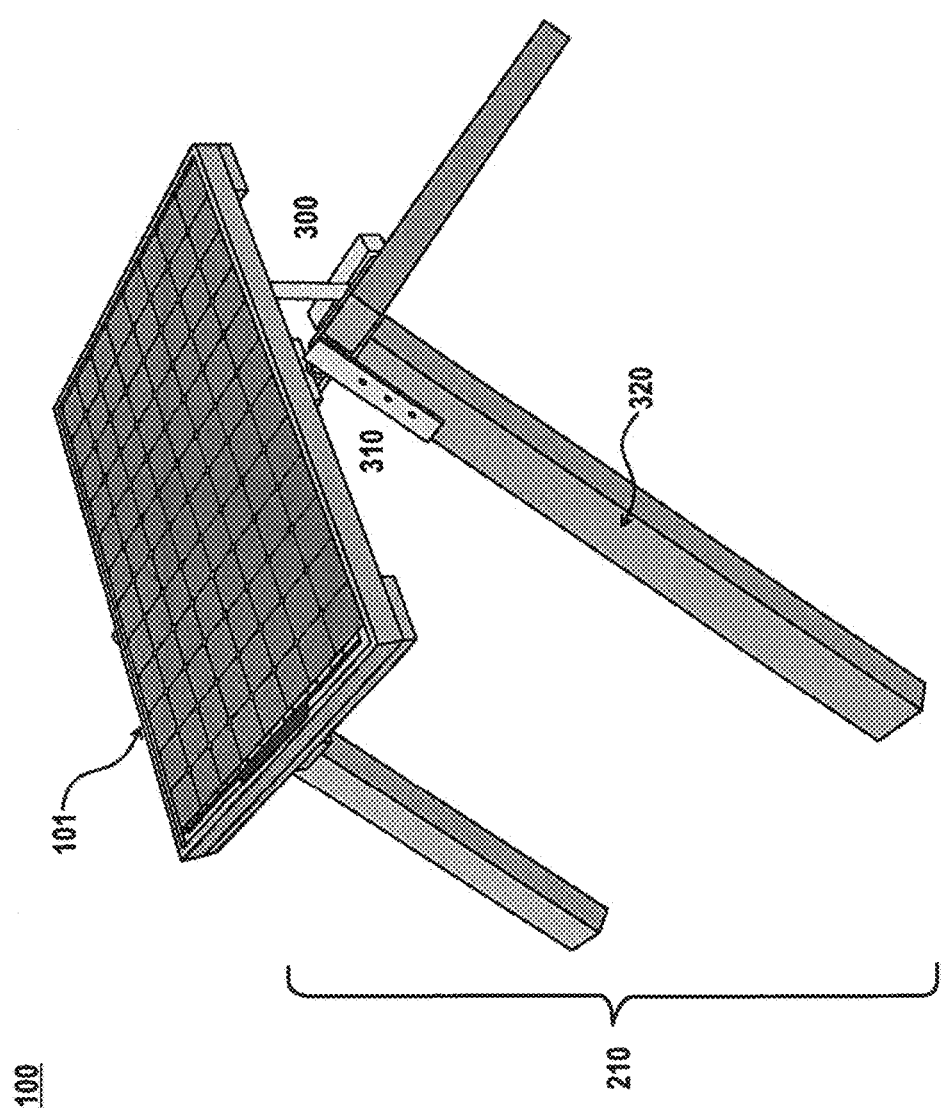
FIG. 3A illustrates an alternative supporting structure for a repositioning system in accordance with another embodiment of the present invention.

In an alternative embodiment, the base supporting structure 210 comprises an A-form frame, as shown in FIG. 3A. The A-frame supporting structure 210 shown in FIG. 3A is constructed using two metal brackets 310 having predetermined holes to affix one or more support beams 320 to the brackets 310 as shown in order to construct the structure 210. In one embodiment, support beams 320 comprise pieces of wood, bamboo, metal or other easily accessible material. The support beams 320 are further reinforced with supporting side pieces (shown with reference to FIGS. 5A-F and will be discussed below) if necessary to ensure stability of the entire structure 210, which can be affected by the weight of the solar panel 101 and water containers (e.g., originating container 110). Accordingly, in a preferred embodiment, an end user can create the structure 210 for solar panel mounting using whatever material(s) is available in their local environment, such that the user is provided only with the metal brackets 310. In an alternate embodiment, the solar panel 101 can be clamped to the mount 103 via a bracket (not shown), which is secured into place by adjusting screws in contact with the back of the solar panel 101. In yet another alternative embodiment, the supporting frame 103 may include a threaded pole for supporting various structure and solar energy collection device sizes, in a manner similar to a clamp.

Figure 3B:
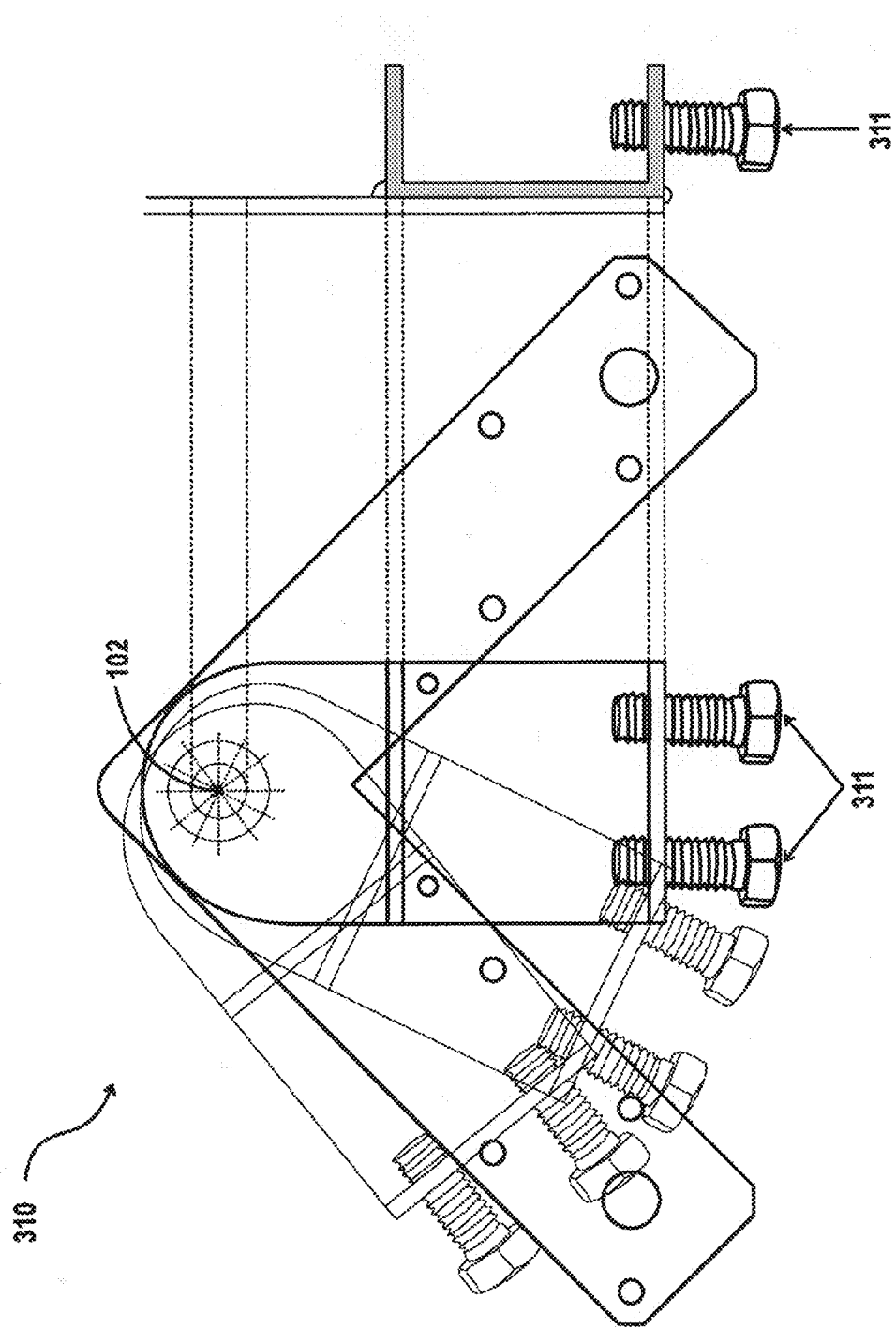
FIG. 3B illustrates an exemplary metal bracket for use with a repositioning system in accordance with one embodiment of the present invention.

An exemplary bracket 310 is further illustrated in FIG. 3B. As shown, the bracket 310 includes one or more threaded screws 311 to affix the solar panel 101. Once affixed to the solar panel 101, the bracket 310 provides for a rotation about the pivot point 102 (also illustrated in FIGS. 2 and 3A). The bracket 310 also illustrates various sized, and positioned holes, to mount the one or more support beams 320 of varying shapes and sizes. Accordingly, an advantage of bracket 310 allows the solar panel 101 to simply slide into the bracket 310 and be tightened by screws 311 that grips the aluminum frame of the solar panel 101 in place using tension.

Turning to FIG. 4, the solar panel 101 is affixed directly to the supporting frame 103. In one embodiment, the supporting frame 103 can be adjusted via various screw positions (shown through a plate 106) along the frame 103 to accommodate one or more dimensions. Advantageously, the supporting frame 103 holds the panel 101 in place and reduces the weight that the solar panel 101 bears (e.g., any containers fixed to the panel).

The base supporting structure 210 is attached to the axle 102 of the solar panel 101, which easily rotates in both the first (e.g., east) and second (e.g., west) direction via two ball bearings (not shown) attached to a top portion of the at least one support beam 320. In some embodiments, the axle 102 of the solar panel 101 may include at least one long rod 105.

For example, the point of rotation for the solar panel 101 may be formed by two short rods 105 that are perpendicularly welded to a flat metal piece 106 that is affixed beside the base supporting structure, as shown in FIG. 4. The flat metal piece 106 can be welded or screwed into the supporting frame 103, allowing the frame 103 to support the load of solar panel 101 rotation consistently and with stability.

As further illustrated in FIG. 4, a rope (or cable) 104 tying the originating container 110 to one end of the solar panel 101 (e.g., the east end) can be affixed to the frame 103 by an eyelet hook—or other similar means-embedded in the frame 103 material—that threads the rope/cable 104 through the hook to secure the container 110 to the solar panel 101. In one embodiment, rope 104 comprises aircraft cable for its durability. However, one of ordinary skill in the art would appreciate that other rope, twine or material similarly can be used. The originating container 110 can be affixed to the frame 103 (or, alternatively, to the solar panel 101, directly or indirectly) in any non-permanent manner to allow removal of the originating container 110 at the end of the exposure period (e.g., for adding more fluid for the following day). The load from fluid displacement is not applied directly on the panel 101, itself. Rather, the load is applied on the replaceable metal brackets 106 or frame structure 103 attached to the panel 101 via the tied rope or cable 104, minimizing damage done to the panel 101 itself. The height and size of the system 100 typically will depend on the size of the solar panel 101. In one embodiment, the height and size of the system 100 is upwards of six feet in order to reduce the likelihood of shading from adjacent objects and to accommodate the filtration unit underneath the panel 101.

An alternate base supporting structure 210 is also proposed in FIGS. 5A-F, where there is a rectangular base that keeps the support beams vertical in a similar manner, as previously described with respect to the triangular base in FIG. 2. A rectangular base can provide the additional advantage of stability when the structure is mounted on unstable ground.

Figure 5B:
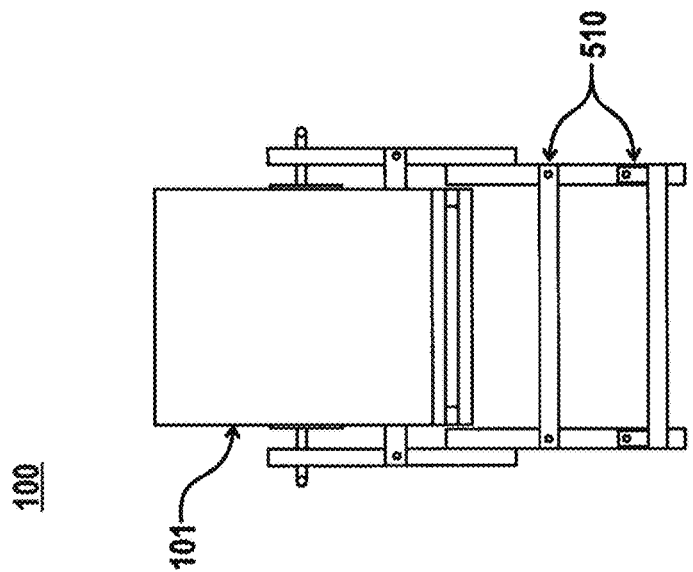
FIG. 5B shows a front view of the supporting structure of FIG. 5A in accordance with another embodiment of the present invention.
Figure 5A:
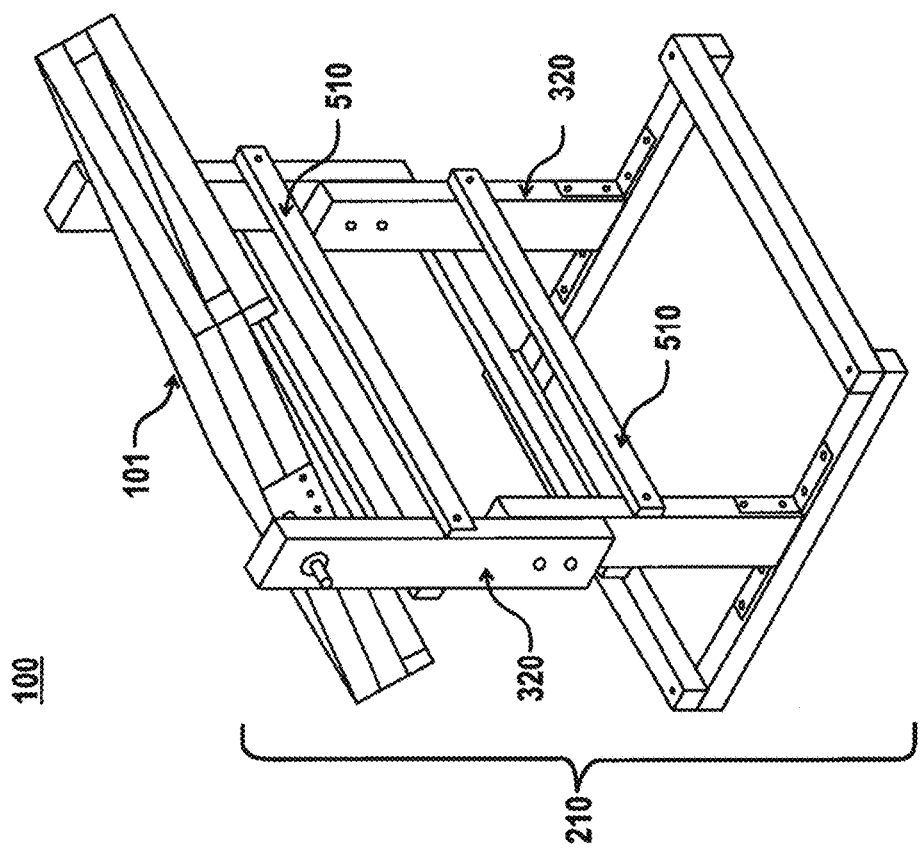
FIG. 5A shows a perspective view of an alternative supporting structure for a repositioning system in accordance with another embodiment of the present invention.
Figure 5D:
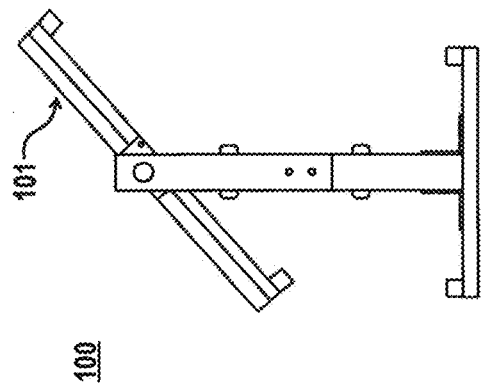
FIG. 5D shows a side view of the supporting structure of FIG. 5A in accordance with another embodiment of the present invention.
Figure 5F:
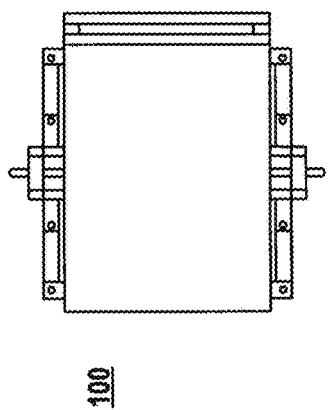
FIG. 5F shows a top view of the supporting structure of FIG. 5A in accordance with another embodiment of the present invention.
Figure 5C:
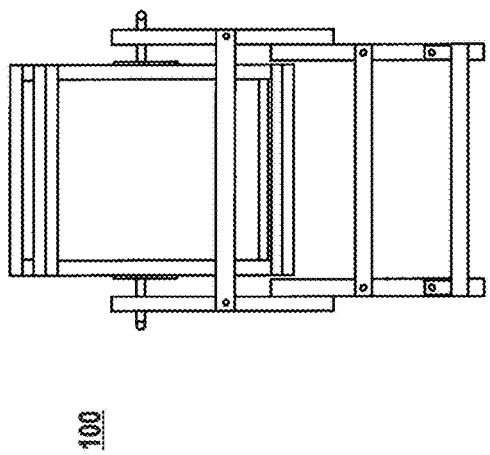
FIG. 5C shows a back view of the supporting structure of FIG. 5A in accordance with another embodiment of the present invention.
Figure 5E:
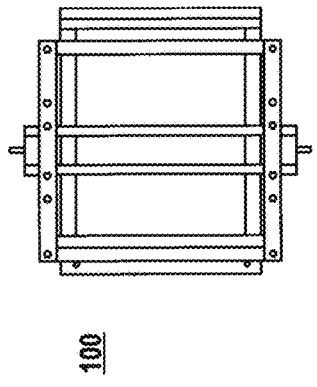
FIG. 5E shows a bottom view of the supporting structure of FIG. 5A in accordance with another embodiment of the present invention.

With reference now to FIGS. 5A-F, the support beams 320 can be further reinforced by one or more sub-support beams 510 that are attached horizontally to support beams 320 to ensure alignment. FIG. 5A illustrates a perspective view of the system 100. FIG. 5B illustrates a front view of the system 100 with the solar panel 101 facing the user. FIG. 5C illustrates a back view of the repositioning system 100 when solar panel 101 is faced away from the user. FIG. 5D is a side view, FIG. 5E is a bottom view, and FIG. 5F is a view from above of the repositioning system 100.

The support beams 320 can be vertical to provide stability and accuracy of the system 100. In one embodiment, the positioning of the one or more sub-support beams 510 are at a portion of the at least one support beam 320 to control the movement of the solar panel 101. For example, positioning the one or more sub-support beams 510 in the manner illustrated in FIG. 5A calibrates the starting position (e.g., 15-degrees from vertical, facing east) of the panel 101 each morning, allowing the end user to ensure that the panel 101 is in the correct position before the exposure period. In another embodiment, the sub-support beam 510 placement may be configured to restrict the solar panel 101 from rotating beyond the maximum rotation range (e.g., 150-degrees) should the weight of the originating container 110 be too heavy.

As previously described with reference to FIG. 2, the collecting container 130 is fitted with a water filtration unit that passes the fluid through, removing it of various biological pollutants (bacteria, dust, insects, etc.) that may have contaminated the water that the end user has collected prior to the activation of the unit. This collecting container 130 may rest on the ground directly below the originating container 110 and include an opening that is large enough to receive the fluid that drips from the originating container 110. The installed water filter can be any preexisting design that is widely available. Water filtration systems are known to those of ordinary skill in the art. Possible water filtration materials include, and are not limited to, existing designs for ceramics, sand, gravel and carbon, among many others. In a preferred embodiment, both of the originating and collecting containers 110 and 130 are shaded and protected by a cover (for example, shown in FIG. 7 discussed below) to reduce the amount of debris that can contaminate the filtered water.

In yet another embodiment, the originating container 110 can be fitted with a filtration unit that passes the fluid through similar to the filtration unit of the collecting container 130 discussed above. In this case, the collecting container 130 may not need a separate filtration unit and would simply collect and protect the filtered fluid received from the originating container 110. As an additional advantage, the filtration unit of an originating container 110 may be used to control the flow rate of the liquid into the collecting container 130 in a manner similar to the rate control valve previously discussed.

In another embodiment, the collecting container 130 can be constructed of materials that are locally available, likely to be an industrial bucket (typically of a volume of five gallons as a standard) fitted with a water filtration device within it. Such collecting containers 130 are known to those of ordinary skill in the art. The water filtration device acts as a buffer layer for the fluid (e.g., water) flowing through a bottle cap valve into the collecting container. By the time the fluid (e.g., water) has passed into the collecting container 130, through the water filter and into the bottom of the container 130, most biological contaminants are removed, ready for end usage. It is possible for the collecting container 130 to have a tap 131 (illustrated in FIGS. 2, 8, and 9) near the bottom of the container 130 so the water can be accessed without having to invert the entire container 130 and filter.

Another embodiment integrates this technology with a method of water purification known as solar disinfection (SODIS). SODIS is a type of portable water purification that uses solar energy, in one or more ways, to make contaminated water safe to drink by ridding it of infectious disease-causing biological agents, such as bacteria, viruses, protozoa and worms. In this embodiment, the user would operate the embodiment as previously described with reference to FIGS. 1-4, first allowing the collecting container 130 to fill. The water purification process would occur on the following day, when the entire collecting container 130 is placed in a rectangular oven unit with reflective sides to allow for another day's exposure to sunlight to purify the water. The reflective sides optimize the collecting container's exposure to the sunlight. This procedure would require two sets of collecting containers 130 to allow them to be switched on alternating days—one set to fill water while the other is purifying.

Figure 6A:
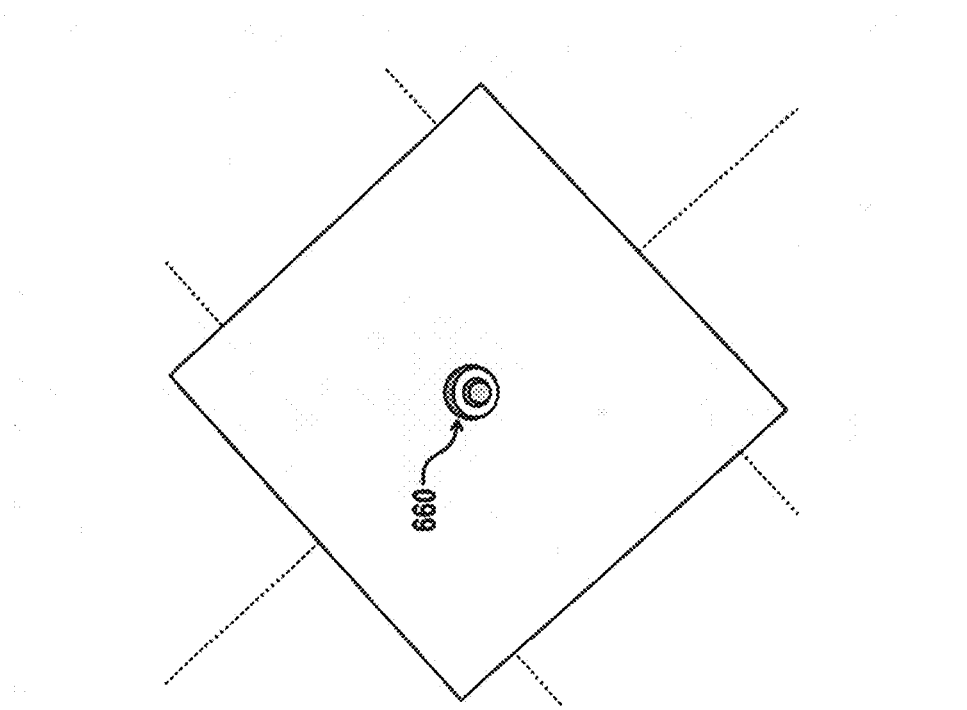
FIG. 6A illustrates a top view of exemplary aluminum metal blocks for controlling flow rate of a repositioning system in accordance with one embodiment of the present invention.
Figure 6B:
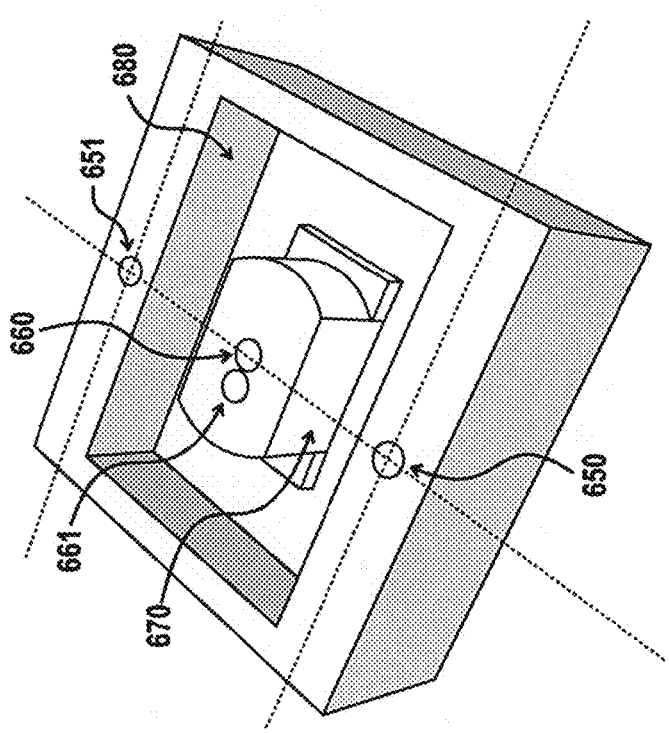
FIG. 6B illustrates a bottom view of the exemplary aluminum metal blocks for controlling flow rate of a repositioning system in accordance with one embodiment of the present invention.
Figure 6C:
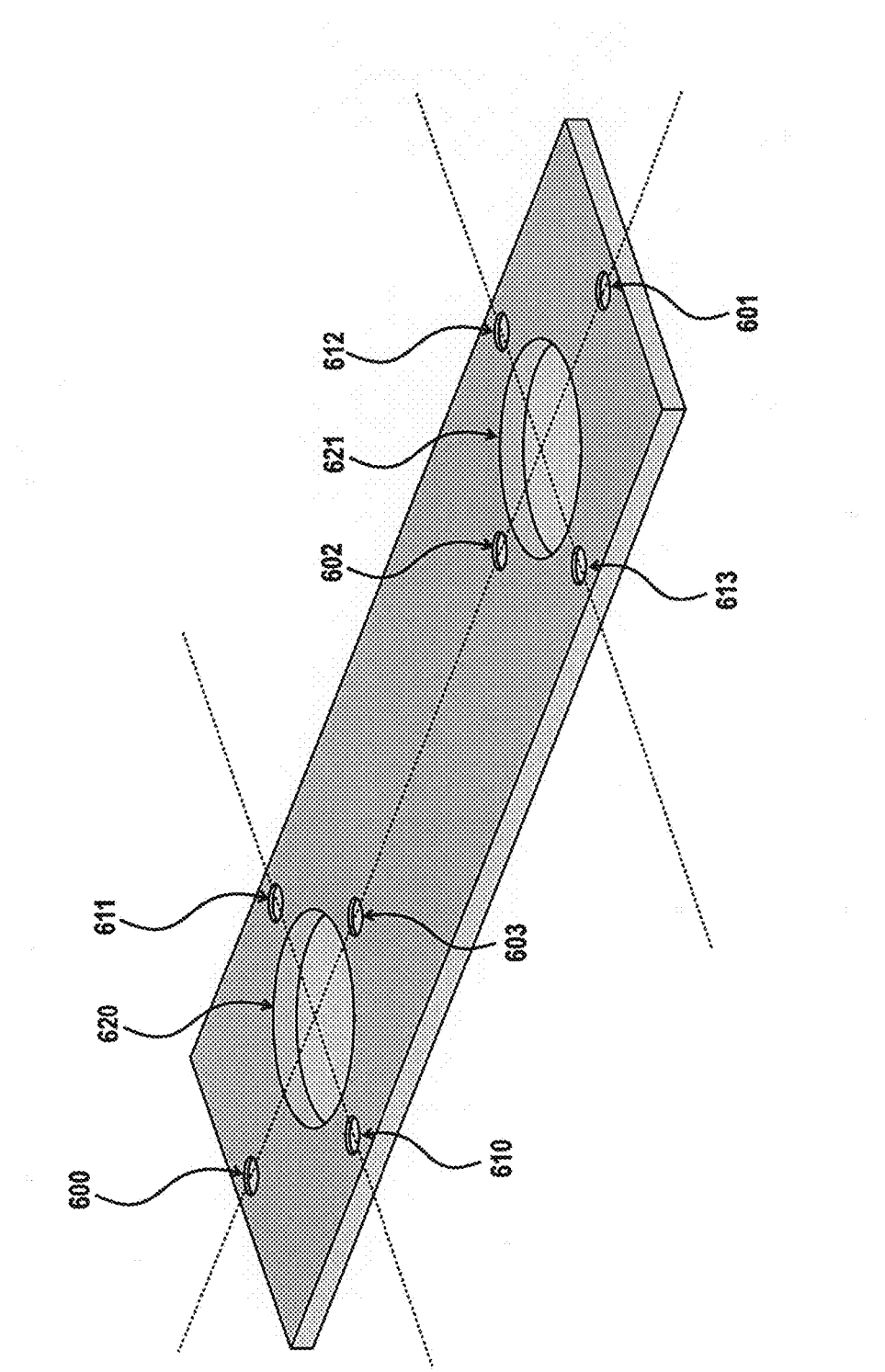
FIG. 6C illustrates a cover for the exemplary aluminum metal blocks for controlling flow rate of a repositioning system in accordance with one embodiment of the present invention.

The weight displacement of water flowing through the filter is controlled by a pre-calibrated flow rate that will gradually accumulate more mass on one side of the solar panel 101, causing the panel 101 to rotate towards the second (e.g, west) side from the first (e.g., east) side of the panel 101. In one embodiment, the flow rate is determined by the size of the opening controlled by the two nylon screws (not shown) that are positioned underneath and inside the originating containers 110 (e.g., two bottles) in two identical small aluminum metal blocks 330, shown in FIGS. 3A, 6A, and 6B. One exemplary block 330 is depicted in FIG. 6A, which is illustrated more generally 330 in FIG. 3A. The underside of the block 330 is a metal plate and is depicted in FIG. 6B. The cover for the block 330 is shown in FIG. 6C and is attached to the solar panel 101 by a hook and cable threaded through the metal plate through the holes 600 and 601. The plate is screwed into the blocks 330 at holes 610, 611, 612, and 613 of FIG. 6C and holes 650 and 651 (which are also the same holes as 610, 611, 612 and 613 in FIG. 6A).

In a preferred embodiment, metal blocks 330 are machined with the following specifications:

A raised portion of the aluminum bar that holds the originating containers 110 in place while they are inverted measures 0.827 inches, with two holes 660 and 661 inside. In one embodiment, holes 660 and 661 measure 0.134-inches. The raised portion of the aluminum bar has a ridge 670 before the bottom of the water channel. One hole 660 clears to the other side of the block (as shown in FIG. 6B), while hole 661 is used to prevent a vacuum from forming within the system 100, which would obstruct water flow. Similarly, holes 602 and 603 are used to prevent a vacuum from forming with then system 100. A hollowed-out channel 680 of the aluminum block 330 measures 1.3×1.736 inches. One of ordinary skill in the art would appreciate that these specifications can be adjusted for different embodiments.

The aluminum bar contains a pathway for the water to flow at a controlled rate out of the bottles of water, which is narrowed by the positioning of the two nylon screws. These two nylon screws are installed on the inside of the metal block (660 of FIG. 6A) to prevent the external environment from being able to tamper with the flow rate while the embodiment is in operation. The water bottles are held in place through inserts 620 and 621.

In another embodiment, the flow rate could be partially determined by the size of the hole drilled in the bottom of the originating container 110, which will typically be a commonly found plastic beverage bottle, to relieve pressure within the originating container system. In one example, holes of a size 1/32-inch or 1/16-inch allow water to slowly drip out of the originating container 110 throughout the entire day. However, alternate hole sizes may be used to configure a flow rate appropriate for the needs of the final installation.

It should be understood that a number of combinations of holes and locations can be used to achieve the required flow rate to provide rotation for a maximum exposure period (e.g., ten hours). For example, in order to determine the required flow rate, the system 100 can be calibrated by measuring the correct volume of fluid required to fill the originating container 110 and balance the panel 101 so it is parallel to the ground. As fluid flow through the valve has been measured in advance, it is possible to infer which valve and hole combination(s) are necessary to achieve the required panel position after a predetermined period has elapsed (e.g., five hours of a full ten-hour exposure period). Because not all solar energy collection devices are weighted equally on both sides, this calibration does not necessarily require that there is an equal volume on both sides of the collection device at the midway position.

It will be apparent to one of ordinary skill in the art that different calibrations of the system 100 can be determined for different weights of panels. Accordingly, this process can be standardized with specific values (such as hole sizing, volume and other relevant data) for specific weights.

The size of the hole and the size of the originating container 110 will vary depending on the size—and consequently, the weight—of the solar panel 101 to be mounted. The volume of fluid (e.g., water) to be used for weight displacement is also dependent on the weight of the solar panel 101. For instance, in another embodiment, two originating containers 110 are used (FIG. 6D) with a volume of 2 L, which is the standard size for a large beverage bottle or less, to be fitted into the machined aluminum block 330 flow rate mechanism. Alternative embodiments can arrange several originating containers 110 together to allow for more fluid (e.g., water) to be gradually dripped and used. Additionally, it also is possible to incorporate an adjustable flow rate valve (not shown) designed of similar materials, or a single-piece plastic-mould, that provides dynamic and/or continuous adjustment of the flow rate.

In one embodiment, to calibrate the system 100, the counterweight 120 of dirt, gravel or another dispensable—but easily accessible and replenishable—material that weighs half as much as the originating container 110 at the beginning of the day will be mounted on the second (e.g., west) side of the solar panel 101. For example, if the total exposure period for the entire day is ten hours (e.g., from 7 am to 5 pm), then after five hours (half exposure), the solar panel 101 must be parallel to the ground in order to face the sun directly overhead. In this example, the drip rate of the originating container 110 must allow for half of the volume to be emptied by the time it is noon. Accordingly, for 150-degrees of rotation and a ten-hour exposure period, to the system 100 requires a rotation of 3.75 degrees every 15 minutes.

In one embodiment, in order to minimize theft of the solar panel 101, the rods 105 are made of metal and can be heated and bent at both ends (not shown) after installation so the panel 101 cannot be removed without cutting the rods 105. The entire frame 210 will be put together with commonly available joining components, likely to be metal screws of an uncommon head shape (e.g., a Robertson square head), so it will be more difficult to disassemble without hand tools. Stakes can be used to mount the frame 210 into the ground securely. In another embodiment, locks are used that can only be accessed with an appropriate key (e.g., Allen key), to prevent the system 100 from being inappropriately removed.

In an alternative embodiment, system 100 includes protection for the mounted rotating solar panel 101 against applied opposing forces. These opposing forces, such as wind loads, can potentially interfere with the rotational path of the solar panel 101 if the structure is not protected. A substantial opposing force is used to compromise the balance of the entire system 100 from one side of the panel 101. As a precautionary measure, it is possible for some embodiments to have a dampener mechanism (not shown) on the central axle to further minimize the amount of rotational deviation that can occur when an opposing force is applied. The dampener mechanism provides additional friction at the axis of rotation to increase the threshold of applied forces necessary before opposing forces can force the panel 101 in the opposite direction.

As shown in FIG. 7, one embodiment includes a skirt 710 that encloses the bottom portion of the system 100, protecting the originating container 110, collecting container 130 and base structure underneath the panel from wind loads and opposing forces. This skirt 710 can be made of a thin material, such as plastic or processed bamboo.

Figure 8:
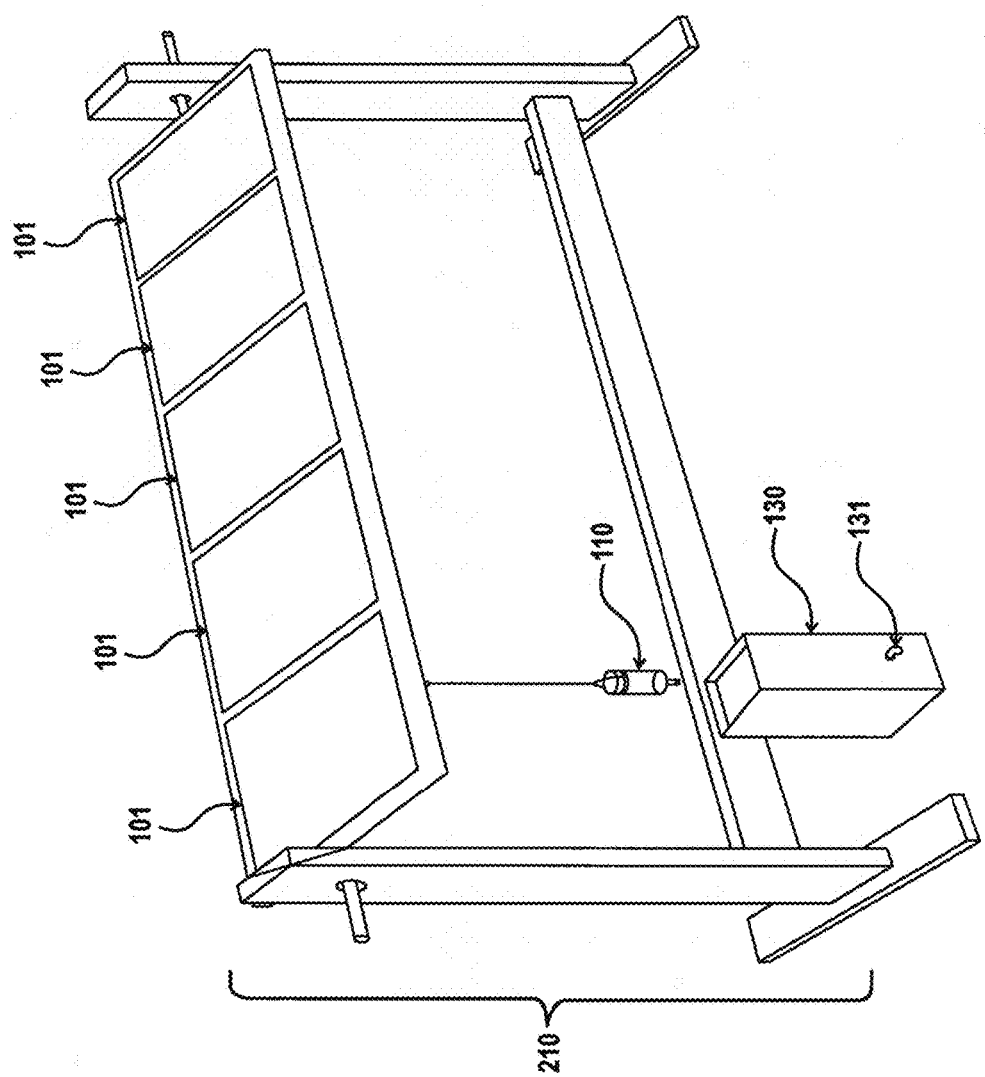
FIG. 8 illustrates another embodiment of a repositioning system supporting one or more solar energy collection devices in accordance with one embodiment of the present invention.

Turning to FIG. 8, alternate embodiments can also mount multiple solar energy collection devices (e.g., one or more solar panels 101) onto one tracker, supporting frame, and square-pyramidal structure.

Figure 9:
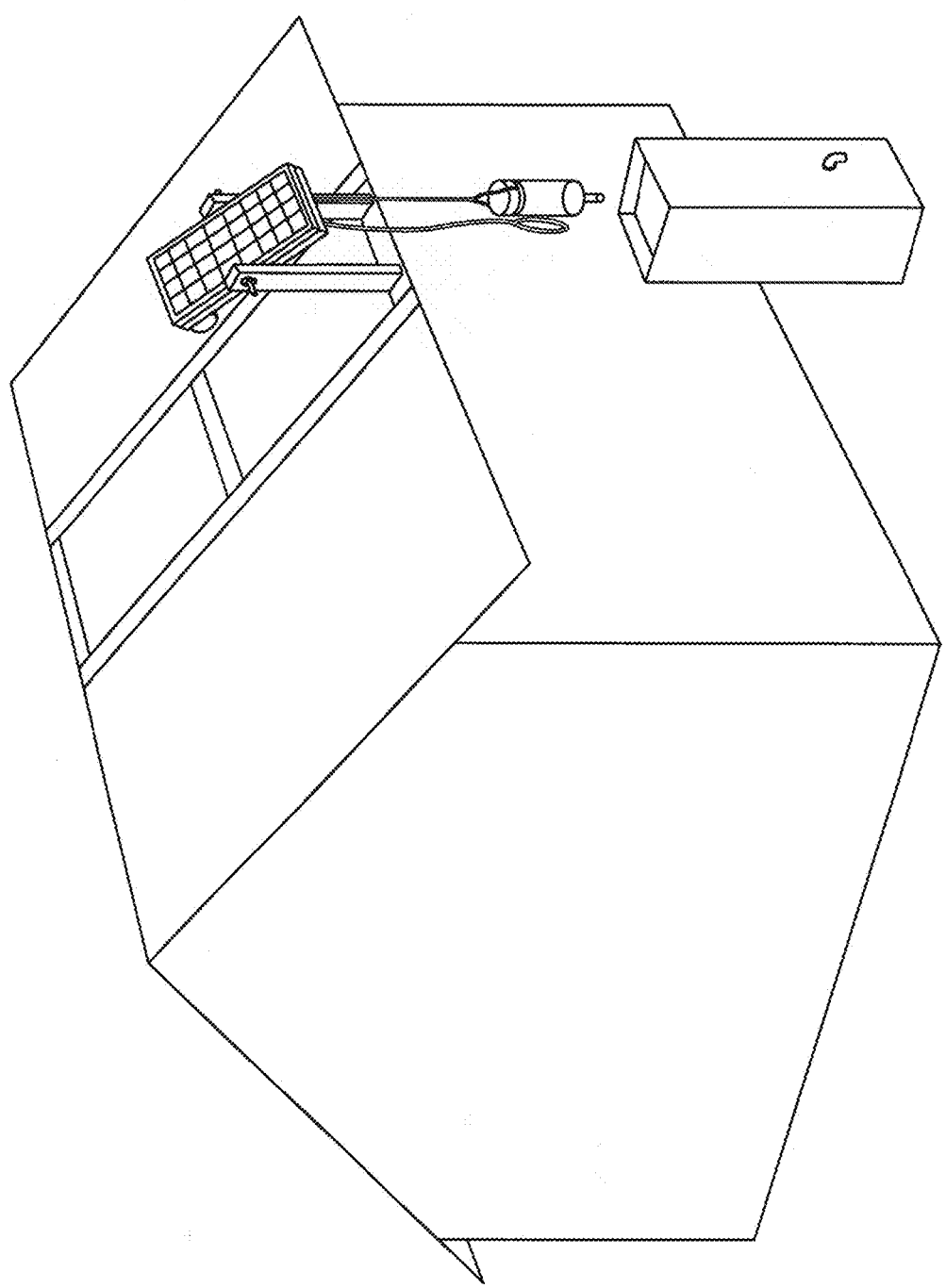
FIG. 9 illustrates another embodiment of a repositioning system configured for installation on an existing structure in accordance with one embodiment of the present invention.

As shown in FIG. 9, an alternative embodiment that mounts the solar panel 101 on the roof 910, or an alternate structure, while incorporating the aforementioned dual-purpose integrated design of system 100. For example, the base structures previously discussed may be of a different structural shape in alternate embodiments. Although a ground mounted structure is discussed for stability, depending on the needs of the installation site, it is possible to conserve space by developing a similar mounting frame for roof installations. Accordingly, a different number of supporting beams at different heights may be used, but the placement of the axle and bearings would remain similar. It would also be possible to hang the originating container 110 off the edge of the roof so that the originating container 110 is easily accessible (e.g., the end user can refill the volume of fluid without having to climb to the roof). The originating container 110 would thus flow fluid into the collecting container 130 resting on the ground below it.

Alternative embodiments can also use this principle of weight displacement and water filtration to be applied, for example, to solar cooking devices that serve as a dual-purpose food preparation unit. The solar cooking device would be mounted in a similar manner to a solar energy collection device discussed above-with bearings and a specific number of support beams. However, because solar cooking devices have a shorter usage period than a solar panel's ten-hour exposure period, the flow rate from the originating to collecting container 130 and the necessary volume/corresponding counterweight would be altered to accommodate this.

Figure 10:
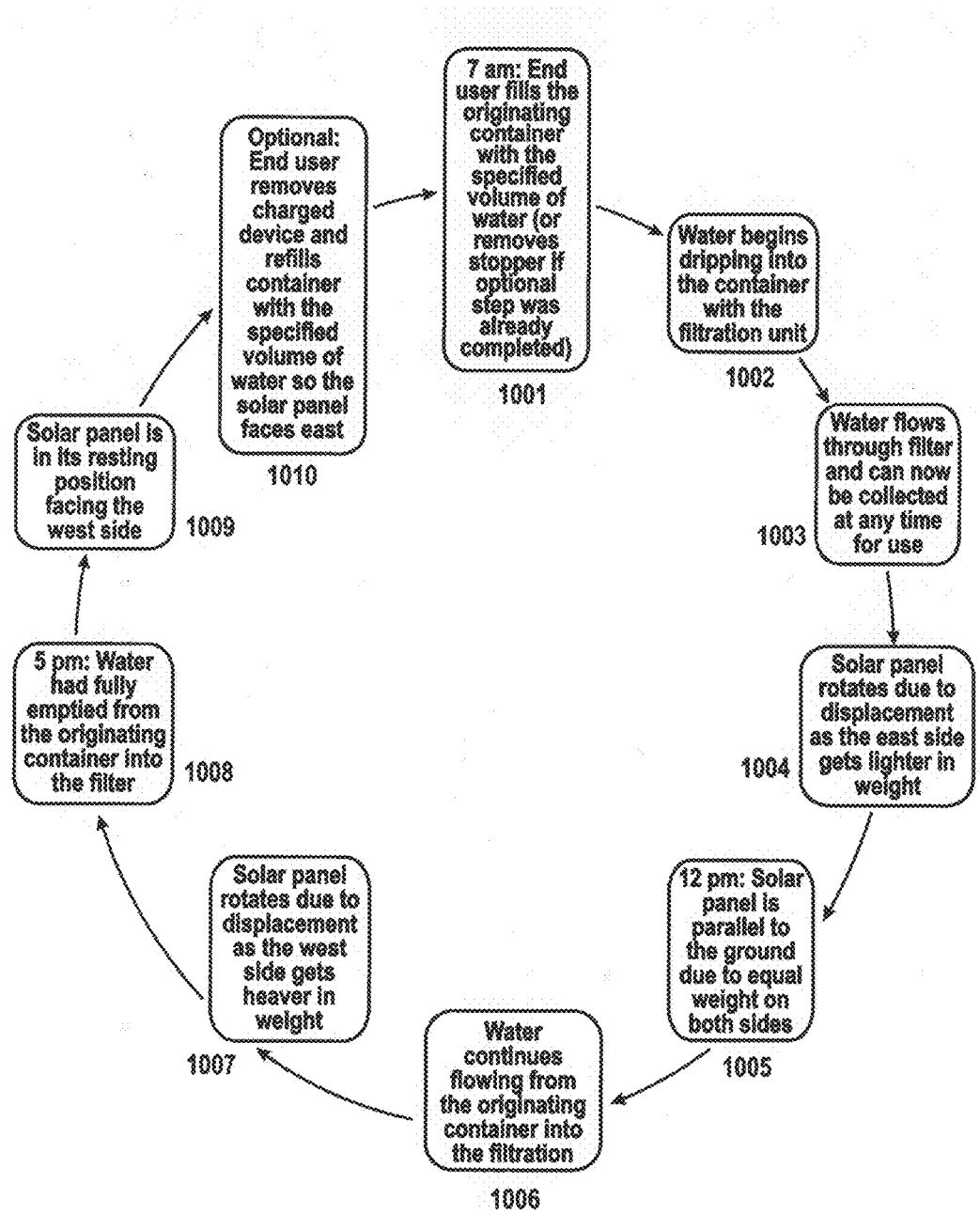
FIG. 10 illustrates an exemplary process for repositioning a solar energy collection device using a repositioning system in accordance with a preferred embodiment of the present invention.

One process 1000 for repositioning a solar panel 101 via repositioning system 100 is illustrated in FIG. 10. Process 1000 begins when a user fills originating container 110 with a predetermined volume of water (action block 1001). This predetermined value is based on the exposure period and the flow rate required, as discussed above. In one example, step 1001 occurs at 7 AM for an exposure period of 10-hours. Once the user has filled the originating container 110 with the predetermined volume of water, the water begins dripping from the originating container 110 into the collecting container 130 (action block 1002). In step 1003, the water dripping from originating container 110 is filtered and prepared for collection (action block 1003). As previously discussed, this fluid filtration system can be included in originating container 110 and/or collecting container 130.

Based on the weight displacement of the fluid flow from originating container 110 to collecting container 130, the solar panel 101 rotates from a first side (e.g., east side) towards a second side (e.g., west side) (action block 1004). In a preferred embodiment, the flow rate causes the solar panel 101 to rotate at an angle such that the panel 101 is perpendicular to the sun at any given point during the exposure period. For example, once half of the exposure period is complete (e.g., noon in this example), the solar panel 101 is parallel to the ground—due to equal weight on both sides of the solar panel 101—such that the solar panel 101 has maximum exposure to the noon sun directly overhead (action block 1005).

Fluid continues to flow from the originating container 110 to the collecting container 130 while being filtered (action block 1006). As this additional weight displacement occurs, the solar panel 101 continues to rotate towards the second side (e.g., west side) because the weight on the second side of the panel 101 increases (action block 1007). After the entire exposure period (e.g., 5 PM in this example), the fluid has fully emptied from the originating container 110 (action block 1008), and the solar panel 101 is in a resting position facing the second side (action block 1009).

In some embodiments, the end user can remove the filtered fluid from the collecting container 130 and refill the fluid in the originating container 110 to the predetermined level for subsequent use (action block 1010). For convenience, process 1000 can be completed as the end user collects the water at the end of the day or plugs/unplugs their electrical devices. A stopper can be used if the user chooses to fill the originating container 110 at the end of the previous exposure period. The stopper can be removed at the beginning of the next exposure period.

Figure 11A:
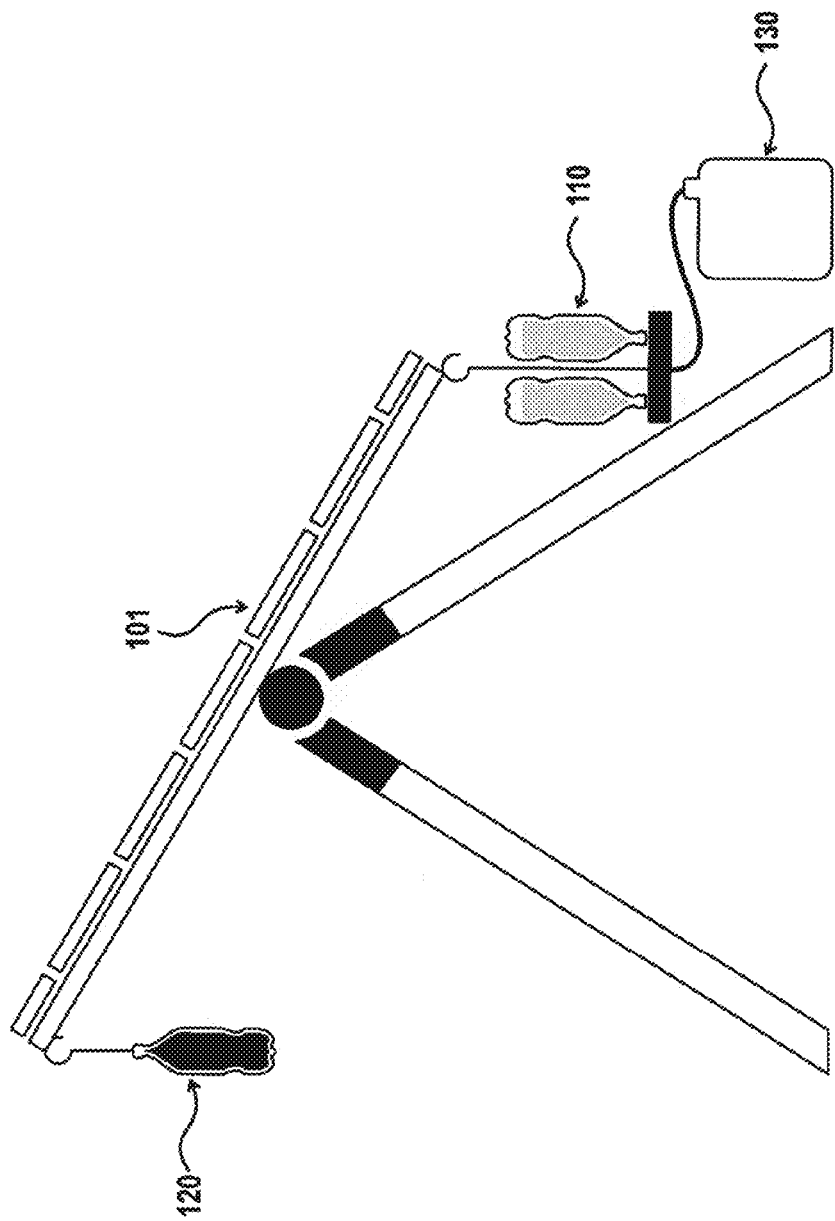
FIG. 11A illustrates another exemplary repositioning system at a first position using two originating containers and a flow rate control system in accordance with one embodiment of the present invention.
Figure 11B:
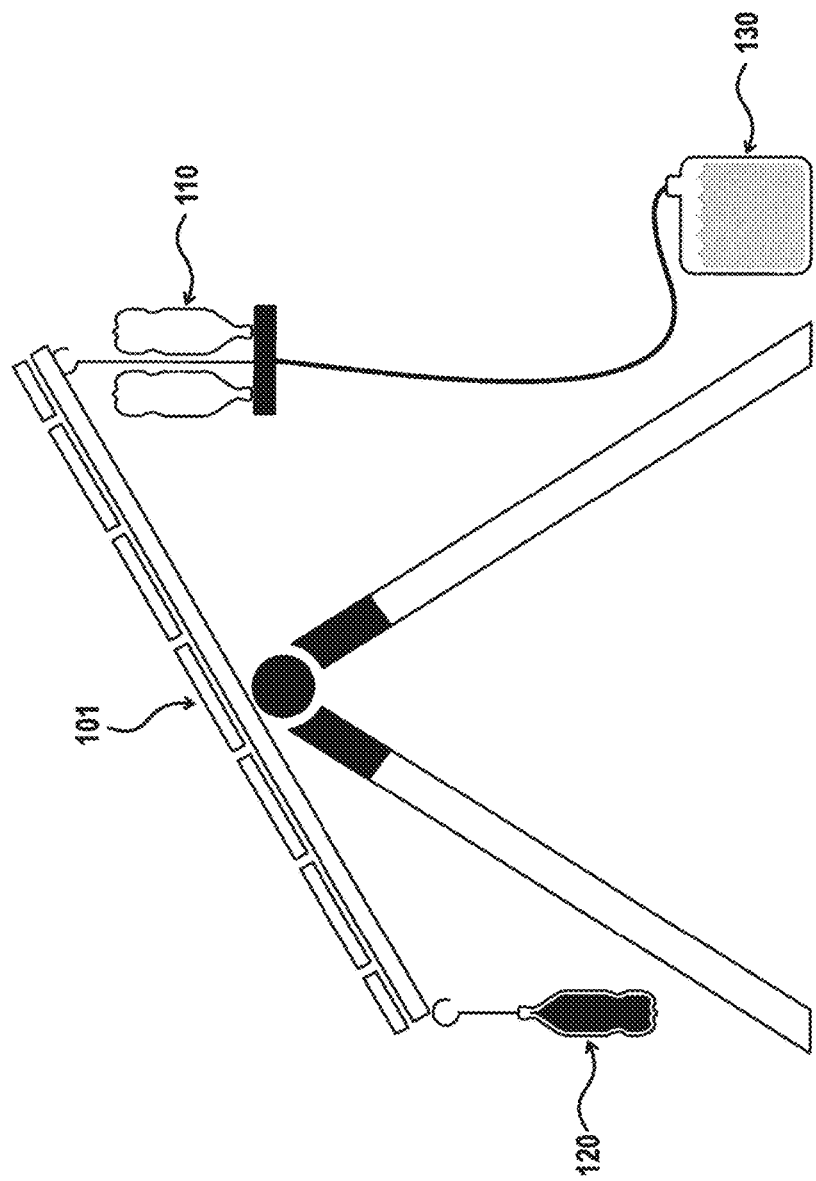
FIG. 11B illustrates another exemplary repositioning system at a second position using two originating containers and a flow rate control system in accordance with one embodiment of the present invention.

FIGS. 11A-B illustrate an exemplary embodiment of the repositioning system 100 using two originating containers 110. As shown in FIG. 11A, the repositioning system 100 is in a first position when the originating containers 110 outweigh the counterweight 120. As fluid flows from the originating containers 110 into the collecting container 130, the solar panel 101 freely rotates towards the second position illustrated in FIG. 11B.

Alternate embodiments can use weight displacement of other substances, such as granules of sand or gravel of a known radius that have been passed through a sieve. Accordingly, a similar valve control to the machined aluminum block 330 can be designed to accommodate the passing of solid materials from the originating 110 to collecting container 130 in a controlled manner. However, necessary modifications, such as widening the valve pathway dimensions, would have to be made in order to accommodate the granular size of any solid particles. The flow rate of such materials can be determined if the solid material (e.g., gravel) is of a known radius, which can be controlled by a sieving material. The granules of the solid material would flow through a narrow opening or valve that can be controlled—similar to an hourglass. This provides the additional advantage for disposing a system 100 in areas that have minimal access to water, or it may be more convenient to use solid materials as long as the climate is dry enough to prevent clumping of granules together.

Additionally, alternate embodiments may use other sizings of holes or valve mechanisms within the aluminum block 330 to control flow rate into the collecting container 130 with the fluid filtration unit. For example, the flow control mechanism could be molded from plastic, with similar dimensions to its aluminum counterpart.

In yet another alternative embodiment, it is possible to configure the automation of the reset process in a tracking device. For more elaborate systems, as an example, (such as those deployed in developed countries on the utility energy scale), it is possible to use a water pump to automatically pump water into the east side of the solar panels at the beginning of every day to automate the process. The water pump can likely be powered by the rotating solar panel 101 in a closed system. If the material used for weight displacement is gravel or some type of solid, an appropriate pump can be provided. This would minimize manual labor, cutting down costs as manual reset of the trackers would not be economically feasible on the utility scale (since there is no end user to directly take responsibility for the maintenance). A portion of the electricity generated by the solar panels could be used to self-power these solar pumps, which would only have to be activated once per day for a minimal amount of electricity.

In an alternative embodiment, the originating container 110 can include a commonly found water bag (e.g., typically 2 L in volume, but this may vary), such as those used for recreational camping applications. In the water bag, a commercially available flow control valve (which uses a screwed dial to increase and decrease the flow of water through the size of the hole), or custom mechanism such as the aluminum block 330, is outfitted at the bottom of the water bag to control the flow rate from the originating container 110 to the collecting container 130. The flow control valve typically includes a locking mechanism that allows the user to maintain a consistent flow rate from day to day once the system 100 has been calibrated for a particular geographical location. The water bag is then hung using metal hooks or a loop fashioned from aircraft cable to the appropriate side of the solar panel 101 as depicted in the embodiments above.

In an alternative embodiment, the originating container 110 and the collecting container 130 represent a closed system with each other through tubing that allows the water to flow from the originating container 110 and the collecting container 130 without exposure to the outside environment. The fluid drips from the originating (hanging on the panel) to the collecting container 130 (resting below) as normal. Then at the beginning of the next day, the end user simply switches the containers (e.g., so the collecting container 130 now becomes the originating container 110), and the cycle repeats. On occasion, the end user may need to add more water as some will naturally evaporate over extended periods of time. This application is intended for systems where water or fluid from the collecting container 130 does not need to be collected by the end user for consumption. A common manifestation of this embodiment is with two soda bottles to serve as the originating container 110 and the collecting container 130, with a tube attached to the caps of both bottles.

What is claimed is:

1. A method for repositioning a solar energy collection device, based on weight displacement of a physical substance, the method comprising:
   filling an originating container with a predetermined volume of the physical substance, the originating container having a first weight and being directly suspended to a first end of the solar energy collection device, and wherein the originating container has a first opening in a top portion for relieving pressure when the physical substance flows out of the originating container;
   dripping the physical substance from a second opening at a bottom portion of the originating container into a collecting container disposed below the originating container, wherein the solar energy device is rotatably mounted to a base supporting structure, a counterweight is removably coupled to a second end opposite of said first end of the solar energy collection device, the counterweight comprising a second weight, and weight displacement caused by dripping the physical substance into the collecting container causes the solar energy collection device to rotate over time as the physical substance flows from the originating container to the collecting container.

2. The method of claim 1, wherein the originating container further includes a third hole on a sleeve portion of the originating container for controlling a flow rate of the physical substance at the second opening before exiting the originating container.

3. The method of claim 1, wherein the collecting container is coupled to a filtration unit for passing the physical substance through to filter a biological pollutant in the physical substance for subsequent reuse of the physical substance.

4. The method of claim 3, wherein the filtration unit comprises at least one of ceramics, sand, gravel, and carbon.

5. The method of claim 1, wherein the solar energy collection device is selected from the group consisting of a flat panel and concentrated photovoltaic solar panels.

6. The method of claim 1, wherein the counterweight includes at least one of dirt, gravel, and a fluid having a predetermined weight.

7. The method of claim 1, wherein the solar energy collection device is configured to freely rotate at least 150-degrees.

8. The method of claim 1, wherein said dripping causes the solar energy collection device to rotate on an east/west plane.

9. The method of claim 1, wherein weight displacement of the originating container causes the solar energy collection device to rotate in alignment to the sun's perpendicular.

10. The method of claim 1, further comprising a stopper for filling the second opening to control the rate of flow of the physical substance.

11. The method of claim 1, wherein the physical substance is selected from the group consisting of: water; gravel; and sand.

12. The method of claim 1, wherein the second weight is half of the first weight of the originating container.

13. The method of claim 1, further comprising a rate control valve fitted in at least one of the second opening of the originating container and the collecting container to control a flow rate of the physical substance from the originating container to the collecting container.

14. The method of claim 13, wherein the rate control valve is housed in an aluminum block unit.

* * * * *